(12) United States Patent
Bailey et al.

(10) Patent No.: US 7,669,128 B2
(45) Date of Patent: Feb. 23, 2010

(54) METHODS OF ENHANCING MEDIA CONTENT NARRATIVE

(75) Inventors: Christopher A. Bailey, Ojai, CA (US); William John Rozner, Woodland Hills, CA (US)

(73) Assignee: Intension, Inc., Ojai, CA (US)

( * ) Notice: Subject to any disclaimer, the term of this patent is extended or adjusted under 35 U.S.C. 154(b) by 0 days.

(21) Appl. No.: 11/687,721

(22) Filed: Mar. 19, 2007

(65) Prior Publication Data

US 2007/0220583 A1 Sep. 20, 2007

Related U.S. Application Data

(60) Provisional application No. 60/783,440, filed on Mar. 20, 2006.

(51) Int. Cl.
*G06F 3/00* (2006.01)

(52) U.S. Cl. .................. 715/719; 715/716; 725/35; 725/37

(58) Field of Classification Search .......... 715/716, 715/719; 725/735, 35, 37
See application file for complete search history.

(56) References Cited

U.S. PATENT DOCUMENTS

| 5,101,364 | A | * | 3/1992 | Davenport et al. | 715/723 |
|---|---|---|---|---|---|
| 5,237,648 | A | * | 8/1993 | Mills et al. | 715/723 |
| 5,442,744 | A | * | 8/1995 | Piech et al. | 715/251 |
| 5,517,605 | A | * | 5/1996 | Wolf | 707/104.1 |
| 5,589,945 | A | * | 12/1996 | Abecassis | 386/83 |
| 5,598,276 | A | * | 1/1997 | Cookson et al. | 386/46 |
| 5,745,710 | A | * | 4/1998 | Clanton et al. | 725/60 |
| 5,778,135 | A | * | 7/1998 | Ottesen et al. | 386/52 |
| 5,861,881 | A | * | 1/1999 | Freeman et al. | 715/201 |
| 5,956,453 | A | * | 9/1999 | Yaegashi et al. | 386/52 |
| 6,061,758 | A | * | 5/2000 | Reber et al. | 711/100 |
| 6,166,735 | A | * | 12/2000 | Dom et al. | 715/749 |
| 6,229,524 | B1 | * | 5/2001 | Chernock et al. | 345/157 |
| 6,243,085 | B1 | | 6/2001 | Roach | 345/302 |
| 6,249,281 | B1 | * | 6/2001 | Chen et al. | 715/753 |
| 6,262,724 | B1 | * | 7/2001 | Crow et al. | 715/723 |
| 6,351,596 | B1 | * | 2/2002 | Ostrover | 386/46 |
| 6,378,130 | B1 | * | 4/2002 | Adams | 725/95 |
| 6,385,388 | B1 | * | 5/2002 | Lewis et al. | 386/94 |
| 6,392,664 | B1 | | 5/2002 | White et al. | 345/717 |
| 6,463,207 | B1 | * | 10/2002 | Abecassis | 386/70 |
| 6,564,225 | B1 | * | 5/2003 | Brogliatti et al. | 707/104.1 |
| 6,628,302 | B2 | | 9/2003 | White et al. | 345/717 |
| 6,628,303 | B1 | * | 9/2003 | Foreman et al. | 715/723 |
| 6,686,918 | B1 | * | 2/2004 | Cajolet et al. | 345/473 |

(Continued)

OTHER PUBLICATIONS

Edward Shen; Storied Navigation, MIT Media Lab; Jan. 1, 2006.*

(Continued)

*Primary Examiner*—Weilun Lo
*Assistant Examiner*—Tuyetlien T Tran
(74) *Attorney, Agent, or Firm*—Charter IP, LLC; Matthew J. Lattig

(57) ABSTRACT

In a method of enhancing a viewer's experience of a video program, a plurality of selectable alternative video program scenes are provided for a video program being viewed on a display. The selectable alternative program versions are pre-rendered video scenes. A user is prompted to select at least one of the selectable alternative video program scenes for viewing.

17 Claims, 10 Drawing Sheets

U.S. PATENT DOCUMENTS

| | | | |
|---|---|---|---|
| 6,760,042 B2* | 7/2004 | Zetts | 715/716 |
| 6,938,208 B2 | 8/2005 | Reichardt | 715/719 |
| 6,941,574 B1 | 9/2005 | Broadwin et al. | 725/37 |
| 6,971,119 B1* | 11/2005 | Arsenault et al. | 725/89 |
| 6,976,229 B1* | 12/2005 | Balabanovic et al. | 715/838 |
| 7,124,366 B2* | 10/2006 | Foreman et al. | 715/719 |
| 7,231,607 B2* | 6/2007 | Neely et al. | 715/747 |
| 7,248,778 B1* | 7/2007 | Anderson et al. | 386/52 |
| 2001/0037303 A1* | 11/2001 | Mizrahi | 705/52 |
| 2002/0053083 A1* | 5/2002 | Massey | 725/46 |
| 2002/0053089 A1* | 5/2002 | Massey | 725/135 |
| 2002/0072966 A1* | 6/2002 | Eldering et al. | 705/14 |
| 2002/0170061 A1* | 11/2002 | DiLorenzo | 725/78 |
| 2003/0018972 A1* | 1/2003 | Arora | 725/47 |
| 2003/0036899 A1* | 2/2003 | Leslie et al. | 704/2 |
| 2003/0058866 A1* | 3/2003 | Kitayama | 370/394 |
| 2003/0093790 A1 | 5/2003 | Logan et al. | 725/38 |
| 2003/0190143 A1* | 10/2003 | Girgensohn et al. | 386/55 |
| 2004/0027393 A1* | 2/2004 | Kato et al. | 345/838 |
| 2004/0059996 A1* | 3/2004 | Fasciano | 715/500.1 |
| 2004/0070595 A1* | 4/2004 | Atlas et al. | 345/723 |
| 2004/0091848 A1* | 5/2004 | Nemitz | 434/365 |
| 2004/0139481 A1* | 7/2004 | Atlas et al. | 725/135 |
| 2004/0194123 A1* | 9/2004 | Fredlund et al. | 725/9 |
| 2004/0267816 A1* | 12/2004 | Russek | 707/104.1 |
| 2005/0120389 A1* | 6/2005 | Boss et al. | 725/135 |
| 2005/0163462 A1* | 7/2005 | Pratt et al. | 386/4 |
| 2005/0198677 A1* | 9/2005 | Lewis | 725/87 |
| 2005/0272013 A1 | 12/2005 | Knight | 434/156 |
| 2006/0064644 A1* | 3/2006 | Joo | 715/751 |
| 2006/0101338 A1* | 5/2006 | Kates | 715/716 |
| 2006/0153542 A1* | 7/2006 | Chun et al. | 386/125 |
| 2006/0200413 A1* | 9/2006 | Kessel et al. | 705/50 |
| 2007/0099684 A1* | 5/2007 | Butterworth | 463/1 |
| 2007/0162854 A1* | 7/2007 | Kikinis | 715/719 |

OTHER PUBLICATIONS

Tsunami; Silent Steel; 1997.*
Avid Technology, Inc.; Media Composer Adrenaline; Jan. 1, 2006.*
James Jung-Hoon Seo; Intercreative Cinama; MIT; Sep. 1, 2001.*
PCT International Search Report, Feb. 5, 2008.

* cited by examiner

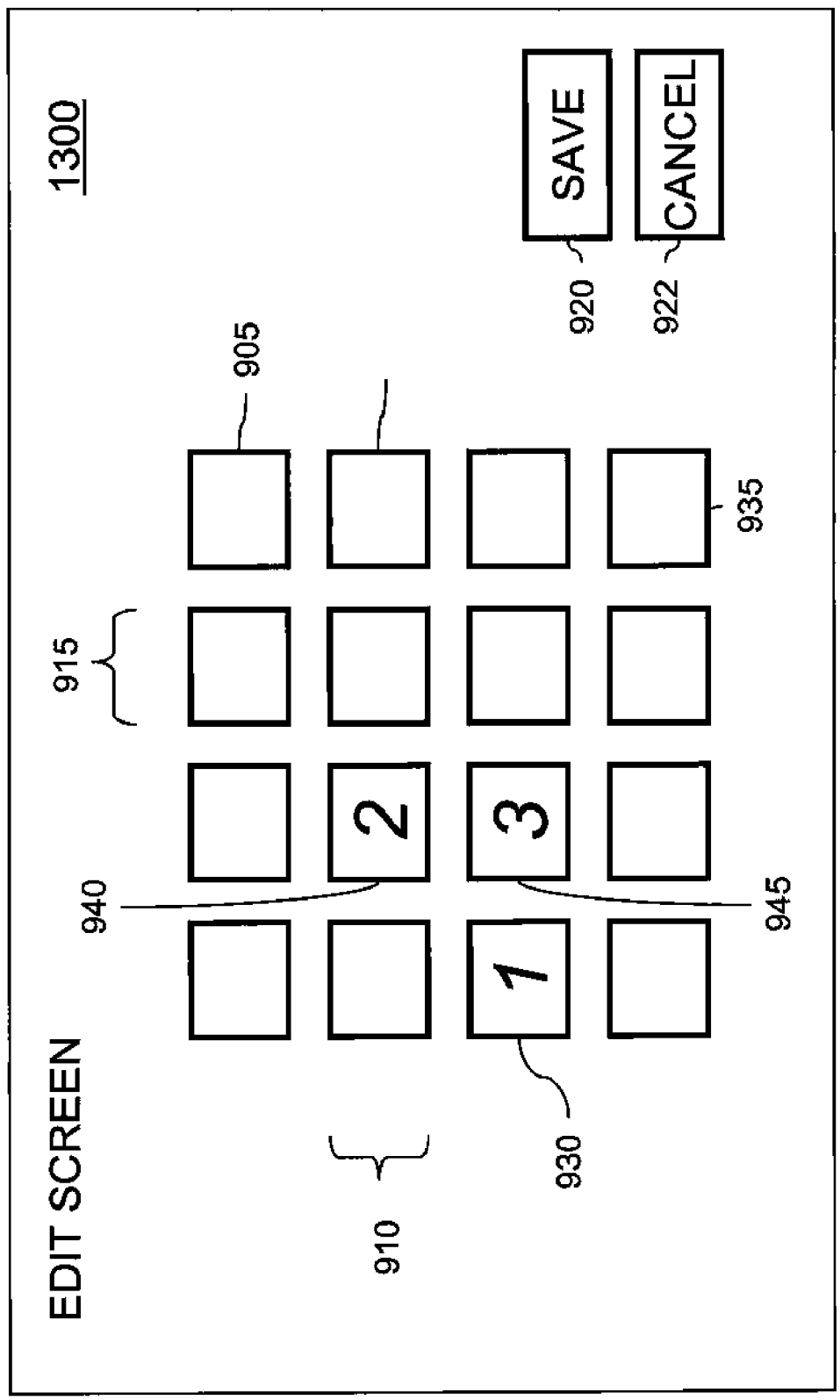

METHODS OF ENHANCING MEDIA CONTENT NARRATIVE

PRIORITY STATEMENT

This application claims the benefit under 35 U.S.C. §119(e) of U.S. Provisional Application No. 60/783,440, filed Mar. 20, 2006, the entire contents of which are hereby incorporated by reference herein.

BACKGROUND

1. Field

Example embodiments relate in general to methods of enhancing media content narrative by permitting a user greater control over media content scene selection.

2. Description of the Related Art

Conventional video narrative has continued to evolve throughout the 20th century up to the present day. The advent of the moving picture or "movie" began a revolution into how stories were told. Beginning in the early 20th century with black-and-white silent film, video programming such as movies and television shows soon incorporated audio and were displayed in vibrant color in theaters and television sets across the world.

Generally, a conventional video program includes a plurality of scenes arranged in an order determined by a program editor (e.g., a movie studio, a director, etc.). The plurality of scenes which constitute the "final cut" are typically a subset of scenes selected from a larger set of scenes; namely, all of the video shot by a director for a film. It is common for some of the scenes shot by the director to be cut or deleted before the final cut of the video program is distributed.

It has also become fairly common for directors to issue their own versions of movies, referred to as a "director's cut" of the video program. As an example, and referring to DVDs, cut portions of the video program may be offered to the viewer in a deleted scenes portion, which is generally maintained separate from the original movie content (i.e., the movie version originally distributed in movie theaters).

While directors and program editors may offer different versions of movies based on a core set of scenes, the viewer essentially has no dynamic control over scene order or selection when playing movies. Thus, the "story" conveyed to the viewer is controlled by the scene editor, and not by the viewer.

SUMMARY

An example embodiment is directed to a method of enhancing a viewer's experience of a video program. In the method, a plurality of selectable alternative video program scenes may be provided for a video program being viewed on a display. The selectable alternative program versions may be pre-rendered video scenes. A user may be prompted to select at least one of the selectable alternative video program scenes for viewing.

Another example embodiment is directed to a method of enhancing a viewer's experience of a video program. In the method, a digital scene selection file including a plurality of video scene selections are loaded. The plurality of video scene selections are associated with a plurality of alternative video program scenes. The selected video scenes from the plurality of alternative video program scenes may be displayed.

Another example embodiment is directed to a method of enhancing a viewer's experience of a video program. A digital scene selection file associated with the video program may be saved. The digital scene selection file includes a customized set of ordered scene selections from a plurality of selectable alternative video program scenes.

BRIEF DESCRIPTION OF THE DRAWINGS

The example embodiments will become more fully understood from the detailed description given herein below and the accompanying drawings which are given by way of illustration only, wherein like reference numerals designate corresponding parts in the various drawings.

FIG. 13 illustrates an updated EDIT screen according to another example embodiment.

DETAILED DESCRIPTION OF THE EXAMPLE EMBODIMENTS

As used herein, the word 'method' may represent a process by which mass amounts of media content/data are organized in an easy to use/access format. This format may provide an 'end user' with the capability to manipulate the formatted content/data. The phrase end user as used herein may include directors, producers, publishers, editors, professionals or casual users of the formatted media content/data. The example methods as to be described below in more detail may be implemented in both hardware and software configurations.

The example methods thus may allow content to be arranged in a manner that provides the end user direct control over how the media content will be presented. The end user is capable of choosing one or more selectable variant(s) of their currently accessed media content. The presentation to the user may be visual, auditory, by touch or a combination of one or more of these types of presentations. As to the sense of touch, the blind may employ the example method by linking it to a brail machine.

Forms of media content, either pre-existing or to be developed in the future, can be exploited using the example system to be described in detail hereafter. Forms of media content may include, but are not limited to, video, still picture, audio and written works. Selections for how the content can be manipulated by the end user may be based in part on the kind or configuration of media content being accessed. Example configuration arrangement types include but are not limited to linear, non-linear, formatted, reformatted, still picture, HD, 480i, 1080i, 1080p, written, text, narration, etc.

Applications or devices that may employ and/or be configured to implement the example methods, or which may constitute one or more components of the example system include but are not limited to: DVDs, CDs, printed books, e-books, audio recordings, video recordings, photo galleries, PowerPoint presentations, high density (HD) technologies and/or storage media, Blue Ray laser technologies or storage media, hard drives, offsite servers, flash memory cards, and/or other equivalent and future media storage types/devices, for example. Output of this data may be protected (encrypted, keyed, password locked, etc.) or provided without encryption/protection. The example methods are applicable to systems employing encryption/protection or no encryption/protection.

The example methods may provide a recording of end user choices to gather demographic data for broadcasters, advertisers and other groups or entities which may be interested in the data. In accordance with the example embodiments, no sensitive personal identity information need be collected.

In order to better understand the example embodiments herein, a system according to an example embodiment will be described, followed by example applications performed within the example system.

Example System

Figure 1:
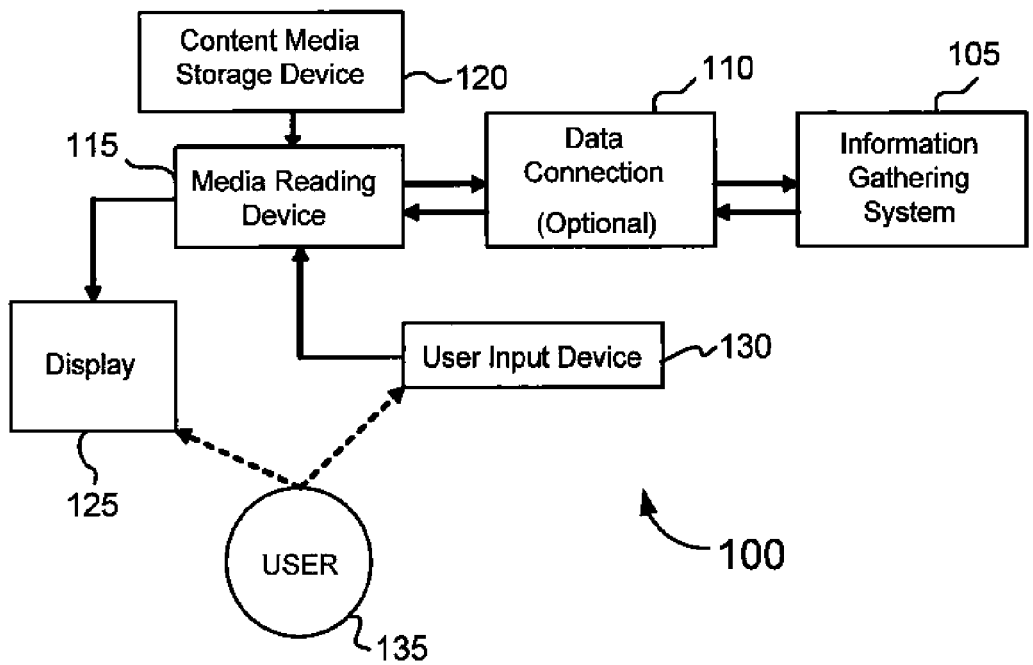
FIG. 1 illustrates a system according to an example embodiment.

FIG. 1 illustrates a system 100 according to an example embodiment. In the example embodiment of FIG. 1, an information gathering system 105 is used to store a plurality of "master sets", with each master set including a plurality of video scenes (e.g., pre-rendered video). In an example, the information gathering system 105 may store one or more "digital scene selection files" associated with each of the plurality of master sets. Digital scene selection files will be described in greater detail later.

In another example, the information gathering system 105 is a server (e.g., an on-site or accessible server, an off-site or not directly accessible server, etc.) storing the master set of video scenes as digital files. In an alternative example, the information gathering system 105 may be embodied as a film vault (e.g., a warehouse) adapted to physically store numerous film reels associated with a variety of video programs (e.g., movies, television shows, etc.) in an analog or tape format.

In an example, if the information gathering system 105 is configured to store the master sets of video scenes in a digital format, the information gathering system 105 includes an optional data connection 110 providing access to the master sets of video scenes. In a further example, a user's access (a user may also be understood as a prospective viewer of media content) to the master set of video scenes is established on a subscription basis, with different levels of subscription granting different amounts of access. In an example, the user may be prompted to provide authenticating information (e.g., a password, a digital certificate, etc.) in order to access any of the video scenes in one or more of the master sets in order to protect the intellectual property of the video scenes of the master set(s). The data connection 110 may be embodied in any of numerous well-known forms, such as an internet connection (e.g., via DSL, cable internet, etc.), a telephone connection, a cable connection, a satellite connection and a wireless connection (e.g., a code division multiple access (CDMA) system).

In an alternative example, the data connection 110 need not be included in the system 100. In this example, the information gathering system 105 transfers the video scenes of the master set(s) via a physical medium, such as a CD-ROM, a DVD-ROM, a flash memory, etc. In an example, the information gathering system 105 burns/writes a subset of a given master set's video scenes onto a DVD and licenses the DVD to a distributor (e.g., NETFLIX, BLOCKBUSTER, etc.) which distributes the DVD to one or more end users.

Whether or not the data connection 110 is deployed, the video scenes transferred from the information gathering system 105 may be sent to a media reading device 115. In the example where the data connection 110 is deployed, the media reading device 115 is configured to receive the video scenes via the data connection 110. Accordingly, in this example, the media reading device 115 may be embodied as an Ethernet card configured for internet data transfer of the video scenes, for example. In alternative examples, the media reading device 115 may be a cable modem, a DSL modem, a wireless Ethernet card, etc.

In the example where the data connection 110 is not deployed, the media reading device 115 is configured to read the video scenes from a content media storage device 120. In an example, the content media storage device 120 may include one or more of a CD-ROM, a DVD-ROM, a flash memory, a hard drive and/or any other type of physical storage medium. Accordingly, in this example, the media reading device 115 may be embodied as a CD-ROM drive, a DVD-ROM drive, etc. The media reading device 115 further includes processing capabilities (e.g., a CPU) and executes software for playing the video scenes in accordance with user selections as will be described later in greater detail.

The media reading device 115 interfaces with a user 135 via a display 125 and a user input device 130. In an example, the display 125 may be a liquid crystal display (LCD) panel, a plasma display panel (PDP), a cathode-ray tube (CRT) display, an organic light emitting diode (OLED) display or any other well-known equivalent display device. In another example, the user input device 130 may be embodied as a remote control (e.g., for a DVD player), a mouse and keyboard combination (e.g., for a computer), a touchscreen (e.g., for a tablet computer), game buttons (e.g., for a Nintendo game boy, a Playstation portable (PSP), etc.) or any other well-known user input device. Collectively, the media reading device 115, the display 125 and the user input device 130 can constitute a single electronic media product, such as a video IPOD, a cell phone, a Nintendo game boy, a PSP, etc. In another example, the media reading device 115 and the user input device 130 can constitute a single electronic media product, such as a DVD player, a DVR device, a Playstation® (e.g., 1, 2 or 3), an XBOX® or XBOX360®, etc.

In an example, the information gathering system 105 may broadcast a plurality of digital signals over a corresponding plurality of channels between the data connection 110 and the media reading device 115. The media reading device 115 is configured to tune to one or more of the channels. The "tuned" digital signal is displayed on the display 125. Alternatively, more than one "tuned" digital signal is displayed on the display 125, for example, in accordance with a multi-picture-in-picture (PIP) protocol. In a further example, the media reading device 115 may include a plurality of receivers which correspond in number to the plurality of digital signals broadcasted over the data connection 110, with each receiver monitoring/tuning to one of the plurality of channels.

Below, example embodiments are described where the user 135 selects one of a plurality of video scenes for viewing on the display 125. It will be appreciated that the "switching"

between video scenes may, in a first example, be performed by loading, from the content media device 120, a video scene corresponding to the user 135's selection. In a second example, the switching or transition is accomplished by "tuning" to a channel having the digital signal corresponding to the selected video scene. The "tuning" is performed at the media reading device 115 by making a different one of the plurality of channels "active", that is, displaying the digital signal (i.e., the video scene) on the "active" channel on the display 125.

Multimedia Dynamic Viewing Process

Figure 2:
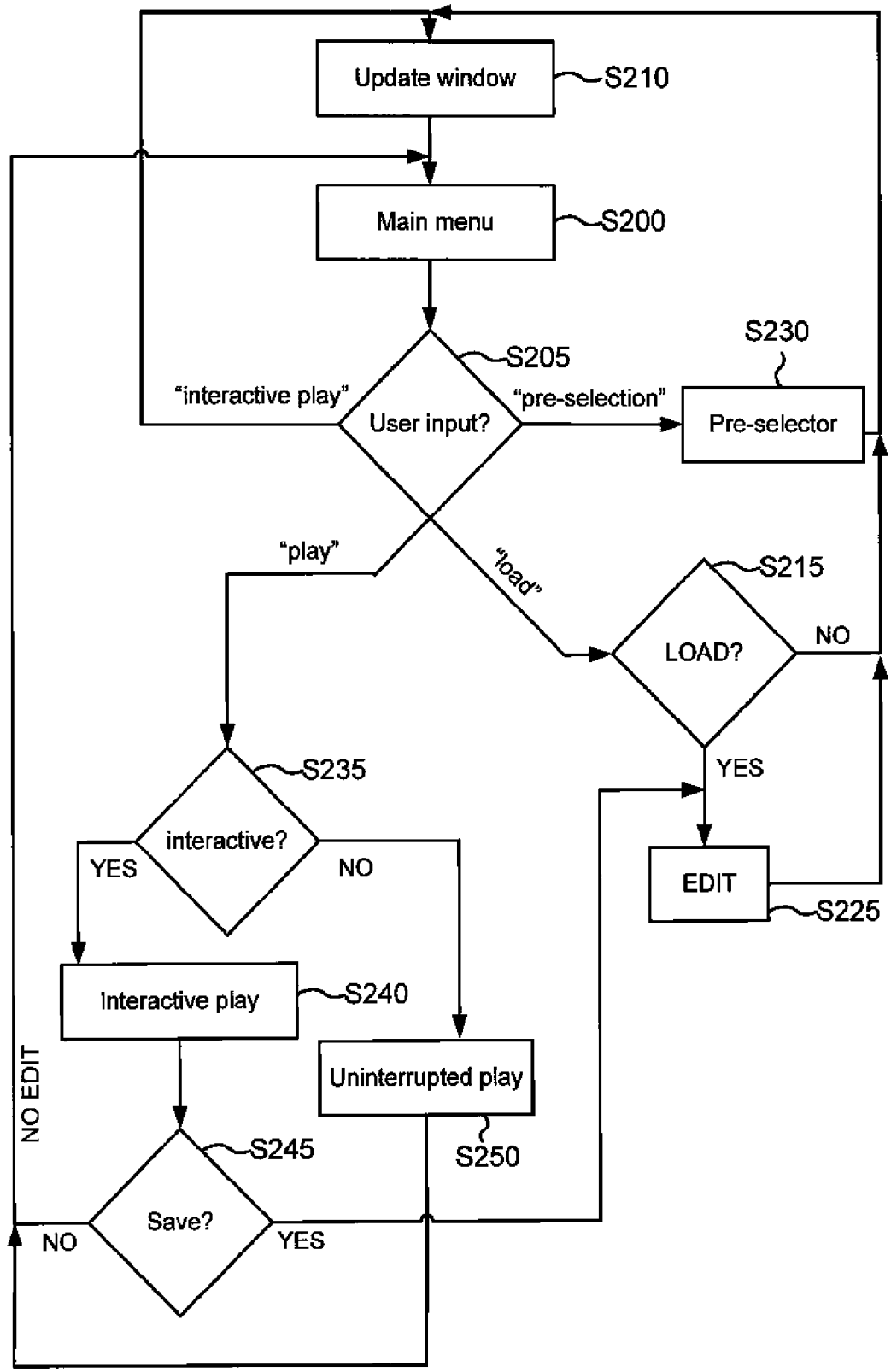
FIG. 2 illustrates a multimedia dynamic viewing process according to another example embodiment.

FIG. 2 illustrates a multimedia dynamic viewing process according to another example embodiment. In the process described below with respect to FIG. 2, terminology is defined as follows:

a "responsive button" is a button, window, box or other viewing screen partition of the display 125, displayed to the user 135 in a menu or sub-menu, upon which an event is triggered if selected (e.g., clicked on) by the user 135 via the user input device 130;

an "output box" is a window, box or other viewing partition of the display 125, displayed to the user 135 in a menu or sub-menu, upon which no event is triggered if selected (e.g., clicked on) by the user 135 via the user input device 130;

a "selection list" is a single row or column of text selections associated with one or more selections (e.g., scene selection files, individual scenes, etc.). The single column of text selections typically includes a plurality of rows, with each row being associated with a single available selection;

a "master set" is a complete set of all scenes associated with a given video program. Typically, less than all of the scenes in the master set are selected by the user 135 for viewing purposes (e.g., because of very similar scenes, etc.). The master set is simply a collection of scenes and does not have a defined scene order; and a "digital scene selection file" is a stored digital file (e.g., stored at the content media storage device 120, the media reading device 115, etc.) including a plurality of scene selections arranged in a particular order. The scene selections select among scenes within the master set, and typically comprise less than all of the available scenes of the master set.

Referring to FIG. 2, and as shown at S200, the display 125 displays a MAIN MENU (alternatively referred to as a "root" menu) to the user 135. The MAIN MENU is typically a start-up screen which presents general options to the user 135 and through which the user 135 accesses sub-menus, as will be described later, with more specific options. In an example, step S200 is triggered by the user 135 loading content media 120 (e.g., a DVD) into the media reading device 115 (e.g., a DVD player) and turning on the display 125 (e.g., a TV set). Accordingly, while the MAIN MENU may be accessed via a user selection, the MAIN MENU need not be triggered in response to user input received via the user input device 130.

Figure 3:
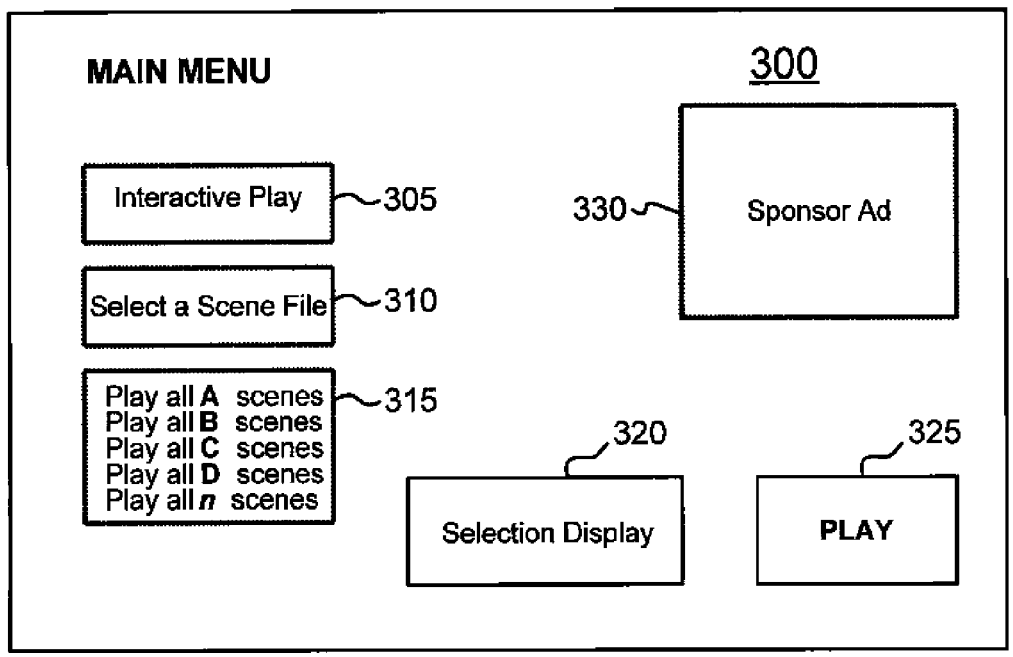
FIG. 3 illustrates a MAIN MENU according to an example embodiment.

FIG. 3 illustrates the MAIN MENU 300 shown at S200 in FIG. 2 in more detail according to an example embodiment. The MAIN MENU 300 includes an INTERACTIVE button 305 ("Interactive Play"), a LOAD button 310 ("Select a Scene File"), a PRE-SELECTION button 315, a Current Selection window 320 ("Selection Display"), a PLAY button 325 and an advertisement 330. The buttons 300-315 are responsive buttons and the Current Selection window 320 is an output box. The PLAY button 325 is initially an output box. As will be described later in greater detail, the user 135 starts a scene configuration process by selecting one or more of buttons 305-315. Once the user 135 completes the scene configura-tion process, the PLAY button 325 converts from an output box to a responsive button in step S210 of FIG. 2.

In FIG. 3, the advertisement 330 may be either an output box or a responsive button. If the advertisement 330 is an output box, the user 135 clicking on the advertisement 330 via the user input device 130 does not trigger a responsive action. In an alternative example, the user 135 clicking on the advertisement 330 via the user input device 130 triggers a response associated with the advertisement, such as retrieving and outputting a company website or product information, associated with the advertisement 330, to the user 135 via the display 125. In another example, the advertisement 330 may initially be stored within the content media storage device 120. The advertisement may thereafter be updated or replaced with another advertisement received over the data connection 110. Thus, the advertisement 330 can be said to be "dynamic" and is not permanent, even when stored within a physical storage medium.

Returning to FIG. 2, the user 135 inputs a user selection (e.g., by clicking on one of the buttons 305/310/315/325) to the media reading device 115 via the user input device 130 at S205. If the user 135 selects the INTERACTIVE button 305, the process advances to S210; if the user 135 selects the LOAD button 310, the process advances to S215; if the user 135 selects the PRE-SELECTION button 315, the process advances to S230; and if the user 135 selects the PLAY button 325, the process advances to S235.

At S210, the display 125 remains in the MAIN MENU 300 and the Current Selection window 320 is updated so as to output a current selected play-mode (e.g., "Interactive Play", "Pre-Selected Play", "Manual Load Play", etc.) to the user 135 via the display 125. Also, the PLAY button 325 transitions (e.g., if function S210 "update window" is being run for the first time) from an output box to a responsive button such that, if the user 135 later clicks on the PLAY button 325, the play-mode output by the Current Selection window 320 is executed, as will be described later in greater detail with respect to function S235. After the Current Selection window 320 updates, the process returns to function S200 and awaits further user inputs.

At function S215, if the user 135 selects the LOAD button 310 at S205, the display 125 exits the MAIN MENU 300 and transitions to a LOAD screen 400, as will now be described with reference to FIG. 4.

Figure 4:
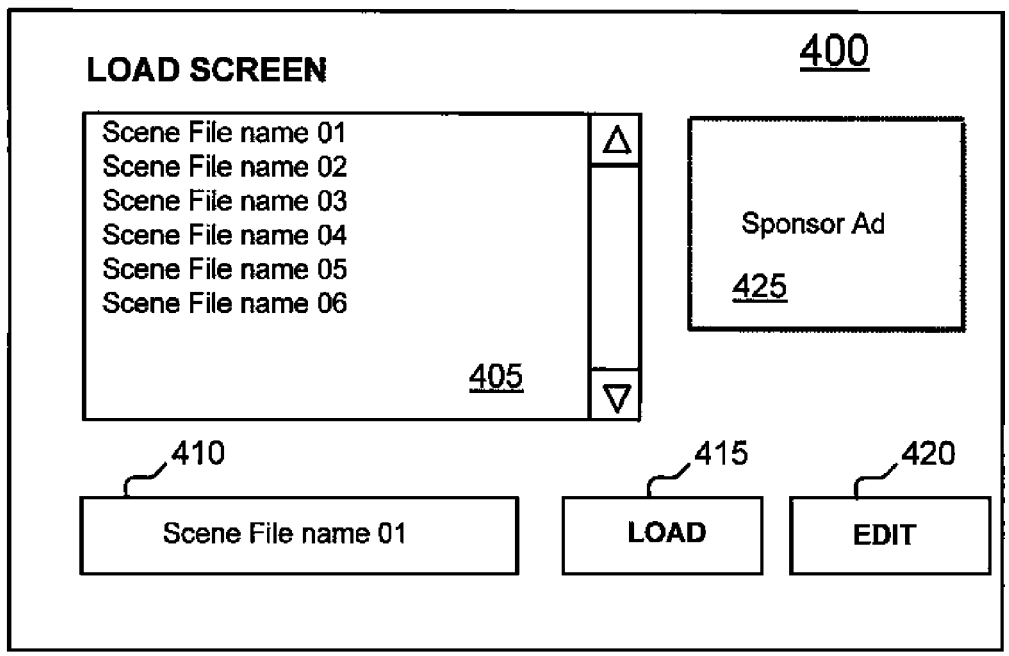
FIG. 4 illustrates a LOAD screen according to an example embodiment.

FIG. 4 illustrates a LOAD screen 400 according to an example embodiment. As shown in FIG. 4, the LOAD screen 400 includes a File List Window 405, a File Name Window 410, a LOAD trigger button 415, an EDIT button 420 and an advertisement 425. The File List Window 405 is a selection list, the File Name Window 410 is an output box, the LOAD trigger button 415 and the EDIT button 420 are responsive buttons and the advertisement 425, like the above-described advertisement 330 of FIG. 3, can be either a responsive button or an output box. FIG. 4 is provided to assist explanation of the LOAD screen functionality at S215 in FIG. 2.

The File List Window 405 displays available digital scene selection files, with each of the digital scene selection files associated with a plurality of scene selections. Upon entry into the LOAD screen 400 at S215 of FIG. 2, a default digital scene selection file is selected within the File List Window 405 and displayed to the user in the File Name Window 410. The File Name Window 410 outputs a current digital scene selection file selected within the File List Window 405 to the user 135 via the display 125. The advertisement 425 is similar to the advertisement 330 of FIG. 3 (e.g., although each of advertisements 330/425 may be different advertisements, associated with different products, etc.), and as such will not be described further for the sake of brevity.

Once the user 135 selects one of the available digital scene selection files from the File List Window 405, the user 135 determines whether the selected digital scene selection file is acceptable "as is" or requires one or more adjustments. If the user 135 determines the selected digital scene selection file is acceptable, the user 135 selects the LOAD trigger button 415 and the process advances to function S210. If the user 135 determines the selected digital scene selection file is not acceptable "as is", the user 135 selects the EDIT button 420 and the process advances to function S225.

At function S225 of FIG. 2, the display 125 exits the LOAD screen 400 and transitions to an EDIT screen 500, as will now be described with reference to FIG. 5. Editing functions are described with respect to FIG. 5.

Figure 5:
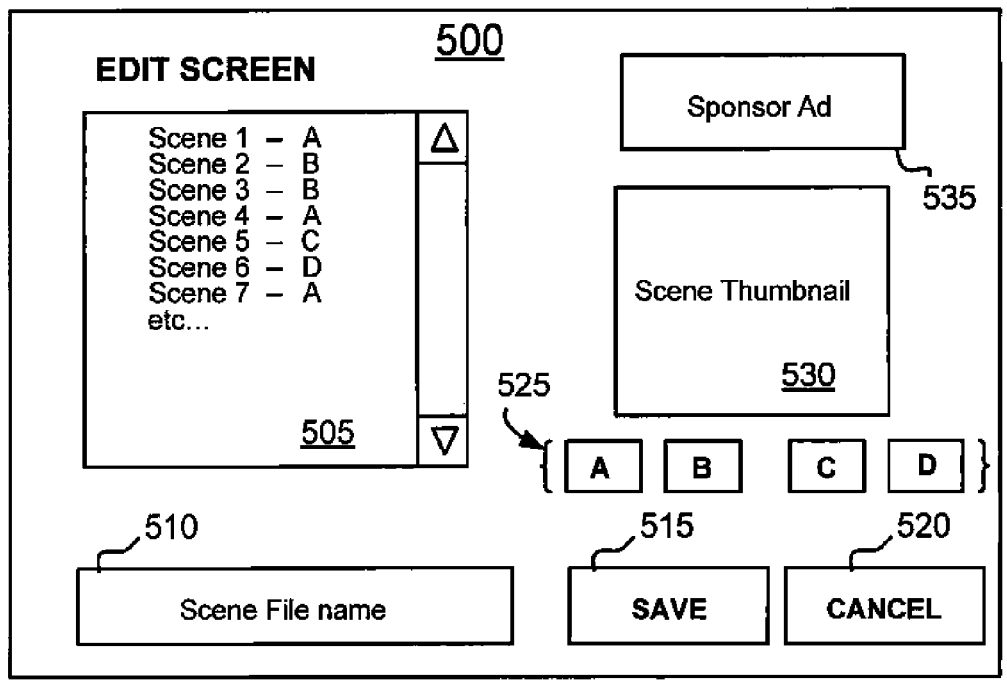
FIG. 5 illustrates an EDIT screen according to an example embodiment.

FIG. 5 illustrates an EDIT screen 500 according to an example embodiment. As shown in FIG. 5, the EDIT screen 500 includes a Scene List Window 505, a Scene Name Window 510, a SAVE button 515, a CANCEL button 520, a plurality of SCENE VIEW buttons 525, a Scene Thumbnail 530 and an advertisement 535. The Scene List Window 505 is a selection list, the Scene Name Window 510 is an output box, the SAVE button 515, the CANCEL button 520 and each of the plurality of SCENE VIEW buttons 525 are responsive buttons and the advertisement 535, as in the above-described advertisements 330/425 of FIGS. 3/4, can be either a responsive button or an output box.

The Scene List Window 505 displays the scenes associated with the selected digital scene selection file and/or a modified list of scenes associated with the selected digital scene selection file. A default scene (e.g., Scene "1") is selected by default and displayed on the EDIT screen 500 according to the functional methodology in the media reading device 115 and initially launched at S225. The Scene Thumbnail 530 displays a representative image associated with the selected scene in the Scene List Window 505. Thereafter, the user 135 selects different scenes within the Scene List Window 505. Whenever a new selection is made, the Scene Thumbnail 530 is updated, as will be described later.

The Scene Name Window 510 displays the name of the selected digital scene selection file. In an example, the Scene Name Window 510 is an output box and does not update the displayed selected digital scene selection file name during function S225. In an alternative example, the Scene Name Window 510 is embodied as a responsive button which allows the user 135 (e.g., within the EDIT screen 500, in another screen (not shown), etc.) to re-name the selected digital scene selection file (e.g., via a series of text entries through a keyboard).

The plurality of SCENE VIEW buttons 525 include a representative SCENE VIEW button 525 for each scene in the master set. Scenes within the master set which are currently selected (i.e., displayed in the Scene List Window 505) are set to an active status and scenes which are not currently selected are set to an inactive status. In an example, the scenes set to the inactive status may be displayed in a different fashion as compared to the "active" scenes. For example, the "inactive" scenes may be faded, displayed in grayscale instead of color, etc. Each of the plurality of SCENE VIEW buttons 525 are responsive buttons which allow the user 135 to toggle (i.e., between active and inactive status) the scenes of the master set.

Accordingly, if the user 135 clicks on an inactive scene, the inactive scene transitions to active status and the Scene List Window 505 is updated to include the newly active scene. Likewise, if the user 135 clicks on an active scene, the active scene transitions to inactive status and the Scene List Window 505 is updated to "delete" the newly inactive scene. The Scene Thumbnail 530 may also be updated if it had previously been displaying the newly inactive scene. In an example, an active scene which moves to the old position of the newly inactive scene replaces the newly inactive scene in the Scene Thumbnail 530.

The advertisement 535 is similar to the advertisement 330/425 of FIGS. 3/4 (e.g., although each of advertisements 330/425/535 may be different advertisements, associated with different products, etc.), and as such will not be described further for the sake of brevity.

If the user selects the CANCEL button 520, the process returns to a previous screen. For example, the previous screen is the LOAD screen 400 at function S215. In another example, the previous screen is a SAVE screen at function S245, as will be described later in greater detail.

If the user 135 clicks the SAVE button 515, whatever changes to the selected digital scene selection file the user 135 has made are saved in memory (e.g., at the media reading device 115). In an example, the "old" digital scene selection file is replaced by the "new" or adjusted digital scene selection file. After selecting the SAVE button 515, the process advances to S210.

In another example embodiment, while not illustrated in FIG. 5, the EDIT screen 500 can include a SAVE AS button. If the user 135 clicks the SAVE AS button, the user 135 is prompted to give the new digital scene selection file a name (e.g., which may be entered in the Scene Name Window 510 via a series of text entries through a keyboard). After the user 135 enters a name for the new digital scene selection file, whatever changes to the selected digital scene selection file the user 135 has made are saved in memory (e.g., at the media reading device 115). After selecting the SAVE AS button, the process advances to S210.

Returning to FIG. 2, in function S215, if the user 135 selects the PRE-SELECTION button 310 at S205, the display 125 remains in the MAIN MENU 300 and advances to function S230. At S230, the user 135 selects one of a plurality of "pre-selected" digital scene selection files. The pre-selected digital scene selection files cannot be updated or changed by the user 135. Further, when one of the pre-selected digital scene selection files is viewed by the user 135, the scene transitions between the pre-selected scenes during video viewing are "seamless", or performed without prompting the user 135 for dynamic scene selection input, as will be described later with respect to function S250. Once the user 135 selects one of the plurality of pre-selected digital scene selection files, the process advances to function S210.

In FIG. 2 at S215, if the user 135 selects the PLAY button 325 in function S205 (i.e., after the PLAY button 325 becomes available by first selecting one of buttons 305/310/315), the process advances to function S235.

At S235, the media reading device 115 determines whether the user 135 has selected an interactive play-mode (e.g., by selecting the INTERACTIVE button 305) or a pre-set scene play-mode (e.g., by selecting either the LOAD button 310 or the PRE-SELECTION button 315). If the media reading device 115 determines that the user 135 has selected the interactive play-mode, the process advances to S240; otherwise, the process advances to S250. At S240, the process executes the interactive play-mode, as will now be described in greater detail with reference to FIG. 6.

Figure 6:
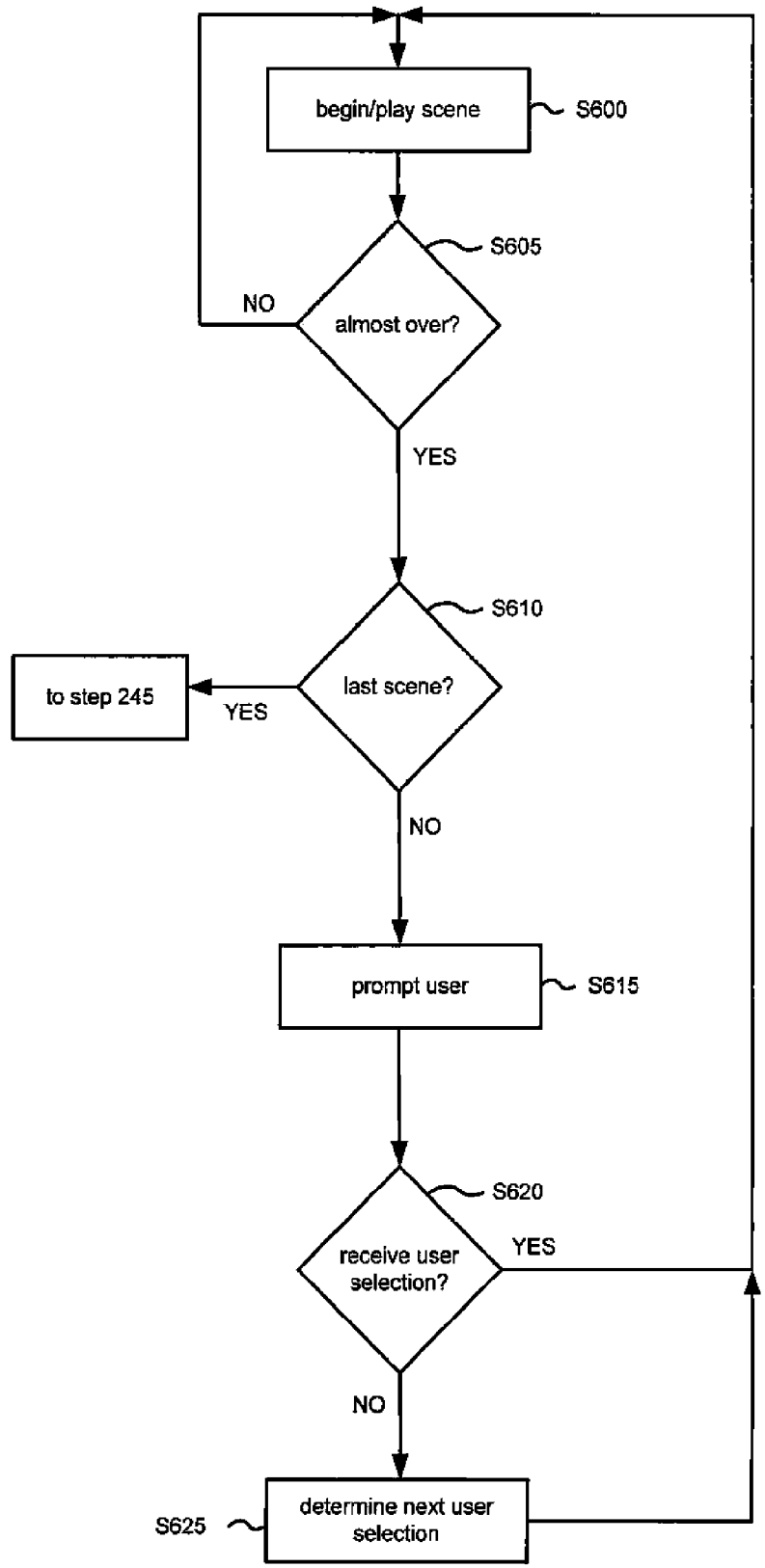
FIG. 6 illustrates an interactive play-mode process according to an example embodiment.

FIG. 6 illustrates an interactive play-mode process according to an example embodiment. As shown in FIG. 6, the process begins by playing a first or initial scene (S600) The initial scene is a default first scene and is not selected by the user 135. The initial scene continues to play at S600 until a time remaining in the initial scene drops below a time threshold. At S605, if the media reading device 115 determines that the time remaining in the initial scene drops below the time threshold (output of S605 is 'YES'), the process advances to S610; otherwise, the process returns to S600 and continues to play the initial scene.

At S610, the media reading device 115 determines whether the currently playing scene is the last scene to be played from the digital scene selection file. If the media reading device 115 determines that the currently playing scene is the last scene to be played (output of S610 is 'YES'), the process as shown in FIG. 6 terminates and returns to the processing of FIG. 2, which advances to function S245 (query to Save file). Otherwise, the process of FIG. 6 advances to S615 (user prompt). At S615, the user 135 is prompted to make a scene selection for a next scene with a PROGRAM PROMPT scene 700 which will now be described with respect to FIG. 7.

Figure 7:
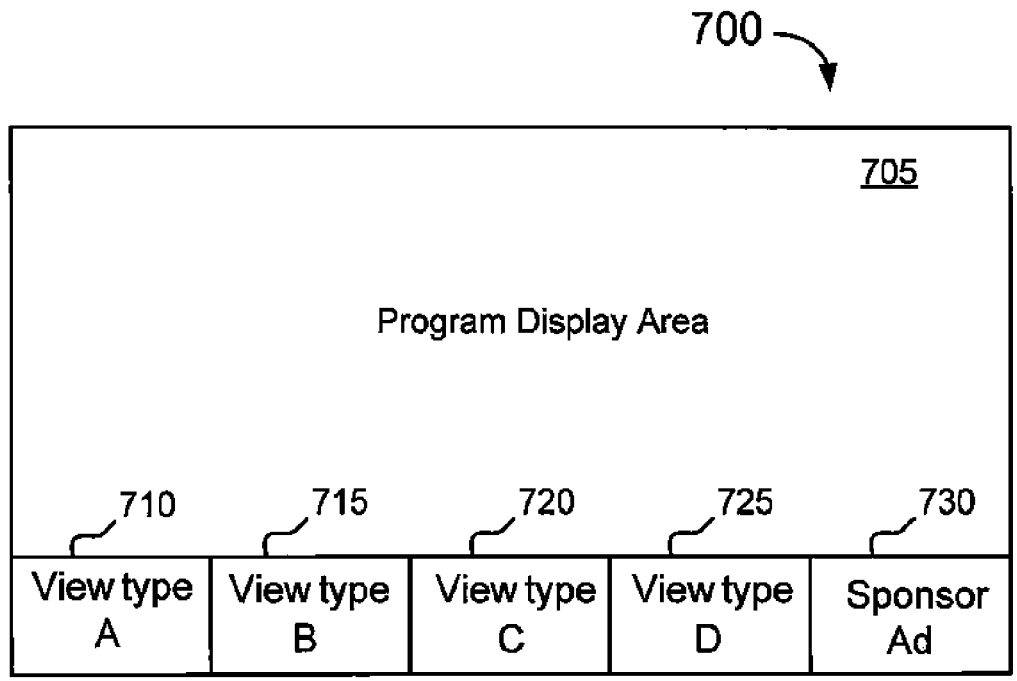
FIG. 7 illustrates a PROGRAM PROMPT screen according to an example embodiment.

FIG. 7 illustrates a PROGRAM PROMPT screen 700 according to an example embodiment. The PROGRAM PROMPT screen 700 includes a program display area 705, next scene selections 710/715/720/725 and an advertisement 730. The program display area 705 displays the currently playing scene to the user 135 and encompasses a majority of a viewing area of the display 125. Accordingly, the portion of the viewing area of the display 125 intruded upon by the next scene selections 710/715/720/725 and the advertisement 730 does not significantly degrade the viewing experience of the user 135. The next scene selections 710/715/720/725 are embodied as responsive buttons. The user 135 is prompted to select one of the next scene selections 710/715/720/725 in which to transition to when the currently playing scene is over via the user input device 130.

In FIG. 7, the advertisement 730 is similar to the advertisement 330/425/535 of FIGS. 3, 4, and/or 5 (e.g., although each of advertisements 330/425/535/730 may be different advertisements, associated with different products, etc.), and as such will not be described further for the sake of brevity. Further, the advertisement 730 can vary from scene prompt (S615) to scene prompt. For example, the advertisement 730 may be related to automobiles during a car chase scene of a movie.

Returning to FIG. 6, in step S620, the media reading device 115 determines whether a user selection has been received via the user input device 130 in response to the user prompt of step S615. If a valid user selection has been made (e.g., one of next scene selections 710/715/720/725), the next scene selections 710/715/720/725 and the advertisements 730 are removed from the viewing area of the display 125 and, when the currently playing scene completes, the process returns to S600 and plays the selected next scene; otherwise, the process advances to S625 (determine next user).

In step S625, the media reading device 115 determines the next scene to play in the absence of user feedback. In an example, step S625 selects the next scene to be the scene associated with a previous user selection. Thus, if the user 135 previously selected a scene corresponding to the next scene selection 720, the media reading device 115 again selects the scene corresponding to the next scene selection 720. Alternatively, a different default scene may be associated for all scenes. For example, if each of the next scene selections 710/715/720/725 correspond to different movie content ratings (e.g., G, PG, PG-13, R, NC-17, etc.), the next scene selection may default to G, or alternatively the highest movie content rating previously selected, or a current movie content rating, in the absence of a user selection so as to protect potential children from viewing adult oriented content. After the functionality at S625 determines the next scene to be played and the currently playing scene ends, the process returns to S600 and plays the next selected scene.

In the example embodiments of FIGS. 6 and 7, the scene selections available at each user prompt (S615) are linear, and do not "branch". In other words, regardless of previous or current scene selections, future scene selections at future user prompts (S615) remain the same.

Returning to FIG. 2, at S245 and after the interactive movie completes playing in accordance with the dynamic scene selections of the user 135, the interactive play-mode exits and the user 135 is prompted to determine whether the scene selections of the interactive movie are saved. If the user 135 selects to save the scene selections of the interactive movie, the display 125 transitions to a SAVE screen 800. Otherwise, the process returns to the S200.

Figure 8:
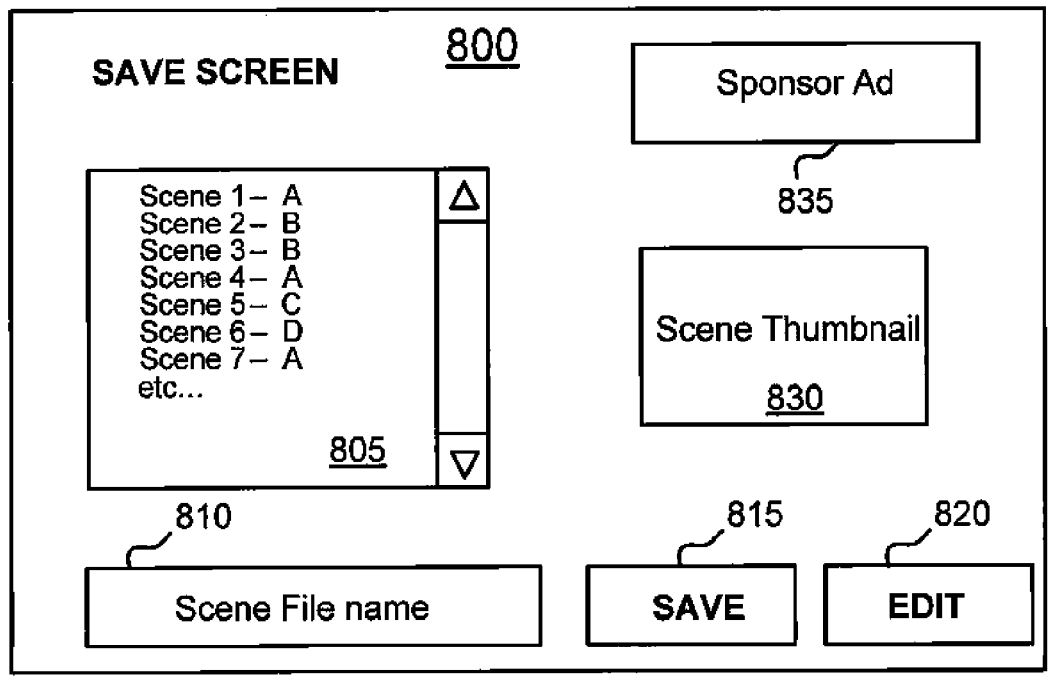
FIG. 8 illustrates a SAVE screen according to an example embodiment.

FIG. 8 illustrates a SAVE screen 800 according to an example embodiment. As shown in FIG. 8, the SAVE screen 800 includes a Scene List Window 805, a Scene Name Window 810, a SAVE button 815, an EDIT button 820, a Scene Thumbnail 830 and an advertisement 835. The Scene List Window 805 is a selection list, the Scene Name Window 810 is an output box, the SAVE button 815 and the EDIT button 820 are responsive buttons and the advertisement 835, like the above-described advertisements 330, 435, etc., can be either a responsive button or an output box.

In reference to the functionality at S245 of FIG. 2, the Scene List Window 805 displays the scenes associated with the actual user-selections made during the interactive play-mode process of FIG. 6 and as reflected by function S240 of FIG. 2. The Scene Thumbnail 830 displays a representative image associated with one of the scenes in the Scene List Window 805 once selected by the user 135. Thereafter, the user 135 may select different scenes within the Scene List Window 805. Once a new selection is made, the Scene Thumbnail 830 is updated so as to display a representative image associated with the newly selected scene.

The Scene Name Window 810 displays the name of the selected digital scene selection file. The Scene Name Window 810 is an output box and does not update the displayed selected digital scene selection file name during implementation of S245.

The advertisement 835 is similar to the advertisement 330, 435, etc., (e.g., although each of advertisements 330, 435, . . ., 835 may be different advertisements, associated with different products, etc.), and as such will not be described further for the sake of brevity.

In the example embodiment of FIG. 8 and referring to S245 of FIG. 2, if the user selects the EDIT button 820, the process advances to S225, as described above with respect to FIG. 5. If the user 135 clicks the SAVE button 815, the user selections from the interactive play-mode process of FIG. 6 are saved in memory (e.g., at the media reading device 115) as a new digital scene selection file. After selecting the SAVE button 815, the process returns to S200.

Returning to S235, the media reading device 115 determines whether the user 135 has selected an interactive play-mode (e.g., by selecting the INTERACTIVE button 305) or a pre-set scene play-mode (e.g., by selecting either the LOAD button 310 or the PRE-SELECTION button 315). If the media reading device 115 determines that the user 135 has not selected the interactive play-mode, the process advances to S250.

Accordingly, at S250, a set of ordered scenes which are either (i) loaded in function S215 in response to the user 135 selecting the LOAD button 310 and loading a digital scene selection file or (ii) selected in function S230 from a set of pre-selected scenes among a pre-defined digital scene selection file are played without interruption. In other words, the user prompts (at S615) associated with the interactive play-mode process of FIG. 6 is not provided in the uninterrupted play-mode of function S250. Once all of the scenes complete playing at S250, the process returns to the MAIN MENU 300 at S200.

Figure 9:
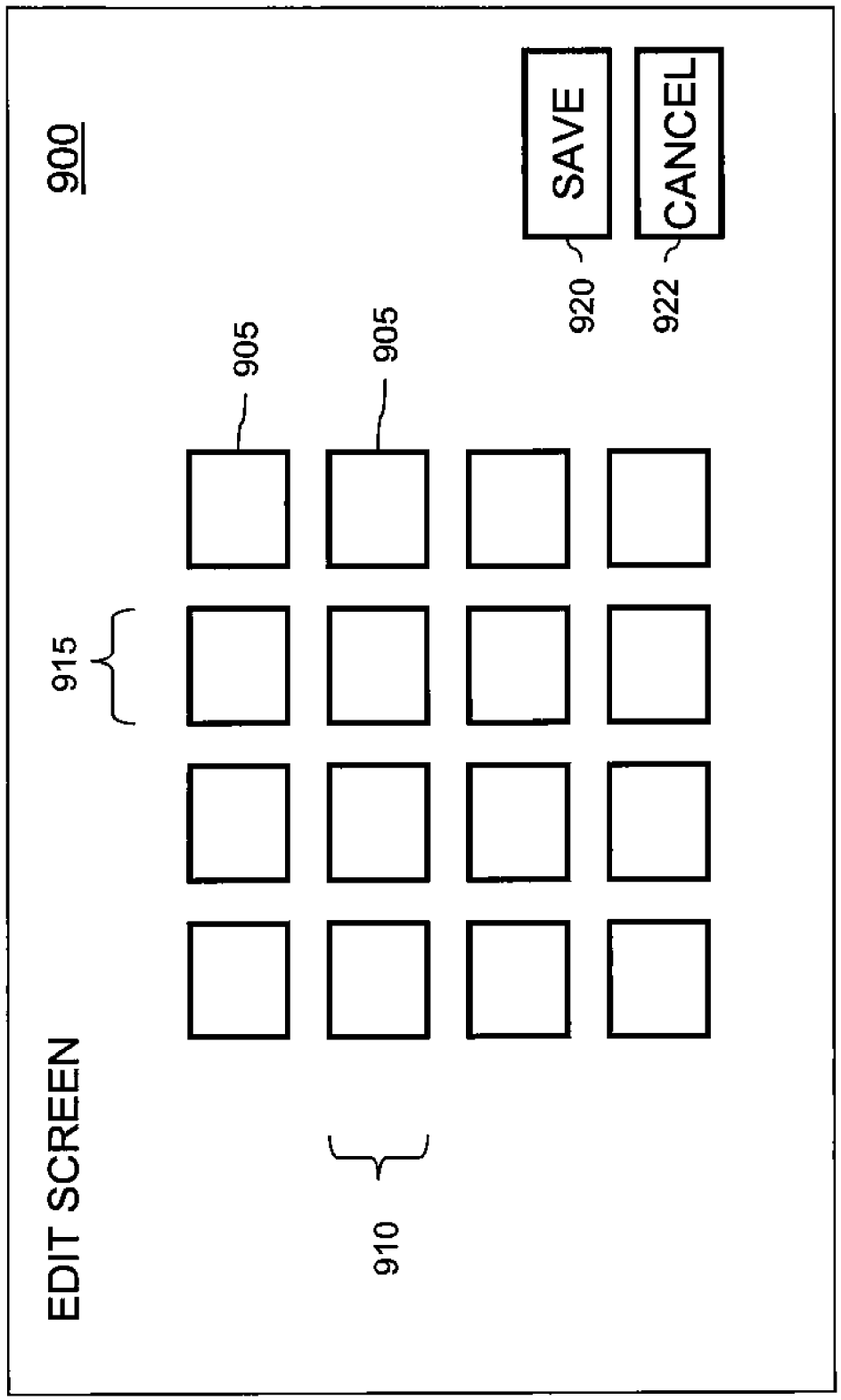
FIG. 9 illustrates an EDIT screen according to another example embodiment.

FIG. 9 illustrates an EDIT screen 900 according to another example embodiment. Unlike the EDIT screen 500 of FIG. 5, which allows the user to generate a digital scene selection file based on a scene list window (e.g., Scene List Window 505), the EDIT screen 900 is presented to the user as a grid matrix via the display 125. As shown in the example embodiment of FIG. 9, the displayed grid matrix includes a plurality of selectable elements 905, a plurality of rows 910 and a plurality of columns 915. Each selectable element 905 is a responsive button and corresponds to one of the available video scenes within the master set. The EDIT screen 900 further includes a SAVE button 920 and a CANCEL button 922 (e.g., similar to the SAVE and CANCEL buttons 515 and 520, respectively, of FIG. 5), each embodied as a responsive button. Further, each element 905 that intersects with a given column 915 and a given row 910 corresponds to a unique video scene among the selectable elements 905 of the grid matrix. Generally, as will be described below in greater detail, the EDIT screen 900 allows multiple user scene selections, in an order or sequence designated by the user 135, to be made part of a digital scene selection file.

Figure 10:
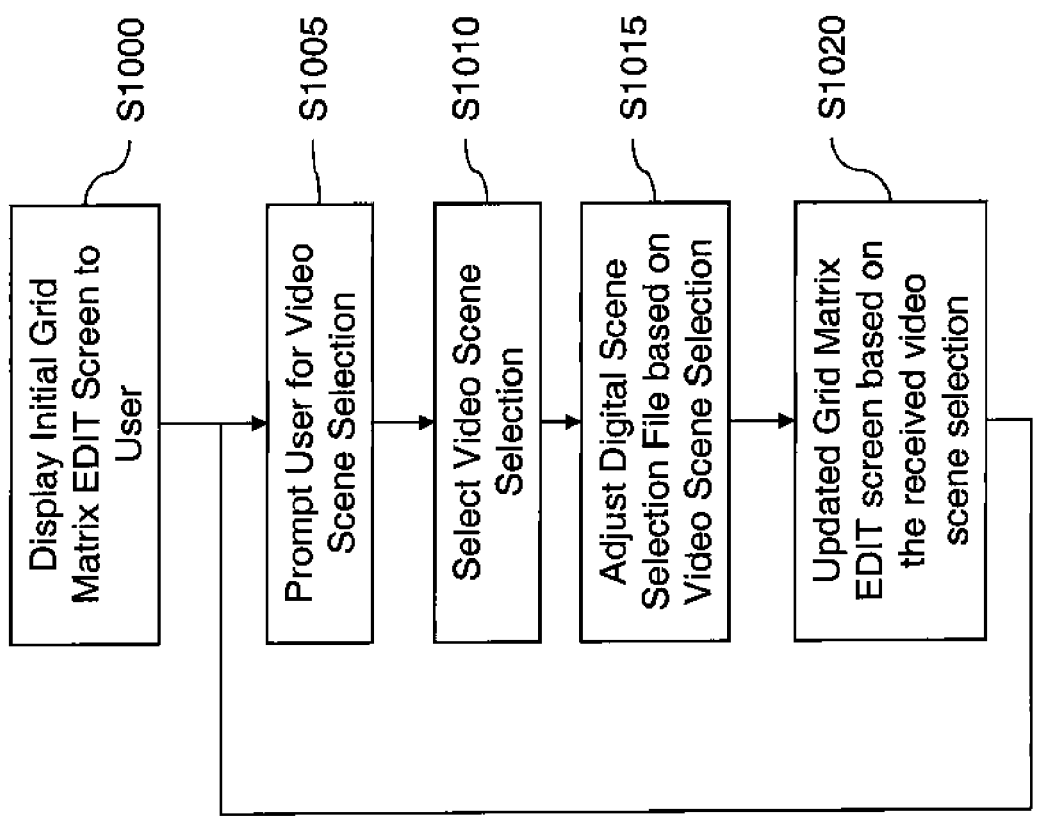
FIG. 10 illustrates a digital scene selection file generating process based on the EDIT screen of FIG. 9.

FIG. 10 illustrates a digital scene selection file generating process based on the EDIT screen 900 of FIG. 9 according to another example embodiment.

In FIG. 10, the grid matrix EDIT screen 900 of FIG. 9 is displayed (S1000) to the user 135 via the display 125. Next, the user 135 is prompted (S1005) to make a video scene selection (e.g., by actively requesting the user 135 to make a selection, by waiting for the user 135 to make a selection, etc.). The user 135 then selects (S1010) one of the plurality of selectable elements 905 (e.g., by "clicking" on the selected element via the user input device 130), and the selected video scene corresponding to the selected element 905 is adjusted (added) (S1015) to a digital scene selection file. Alternatively, at step S1015, if the user 135 selects a previously selected element 905, the video scene corresponding to the re-selected selected element 905 is removed from the digital scene selection file.

For purposes of descriptive clarity, assume that a selectable element 930 among the plurality of selectable elements 905 is selected by the user 135 at S1010, and that the selected element 930 has not been previously selected by the user 135 during a previous selection at S1010. Under these assumptions, the EDIT screen displayed to the user 135 is updated (S1020), as will now be described with respect to FIG. 11.

Figure 11:
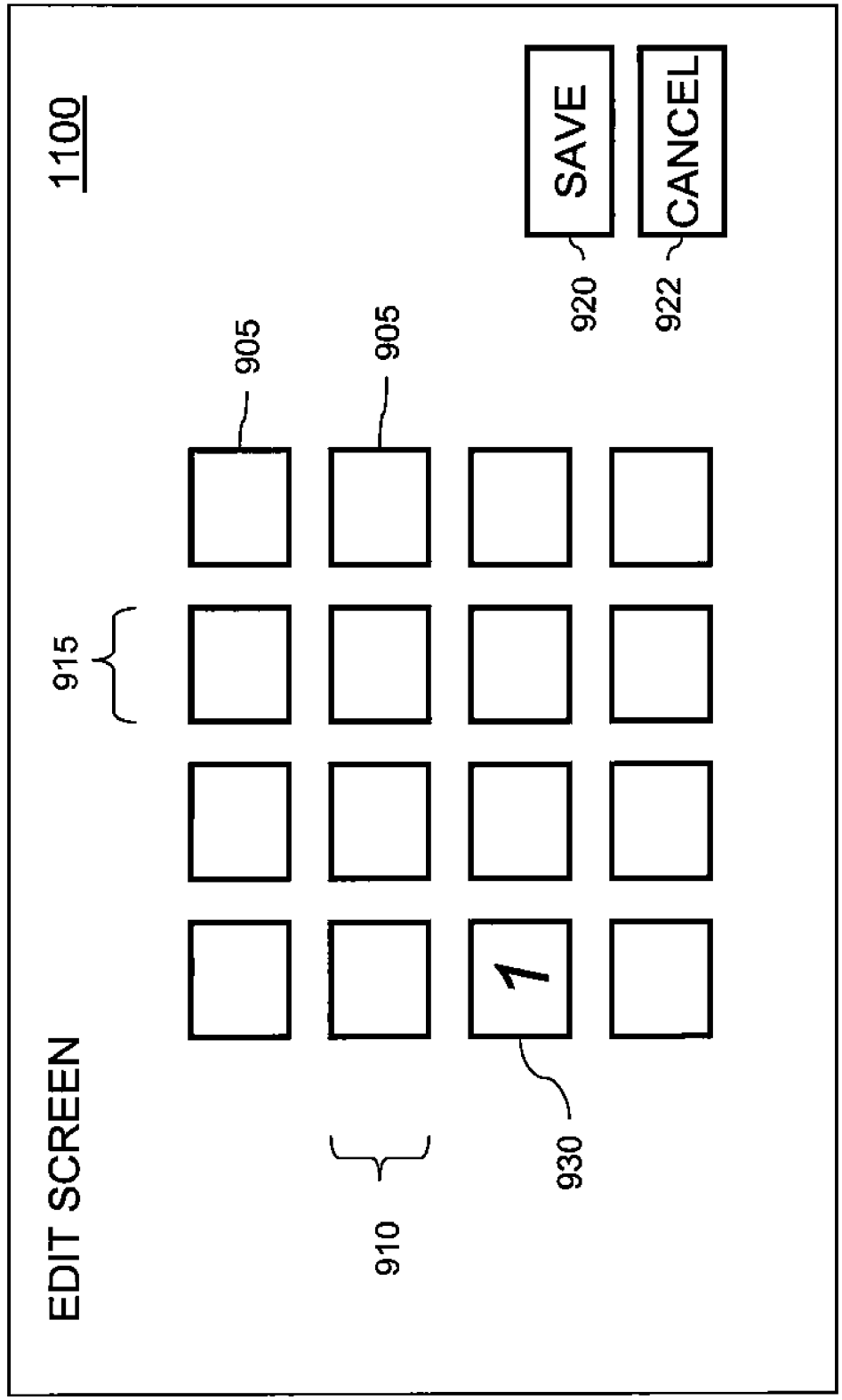
FIG. 11 illustrates an updated EDIT screen according to an example embodiment.

FIG. 11 illustrates an updated EDIT screen 1100 according to an example embodiment. The updated EDIT screen 1100 may be substantially similar to the EDIT screen 900 of FIG. 9, except the updated EDIT screen 1100 includes an indication of the user's 135 video scene selection from step S1010. Accordingly, the selected element 930 outputs a "1". Here, "1" denotes both that the selected element 930 has been selected by the user 135 and further that the selected element 930 corresponds to the first, sequential video scene in the digital scene selection file. In other words, the video scene corresponding to the selected element 930 is played first if the current digital scene selection file is played. In FIG. 10, after the updated EDIT screen 1100 is displayed to the user 135 at S1020, the process returns to S1005 and prompts the user 135 for a new video scene selection.

Figure 12:
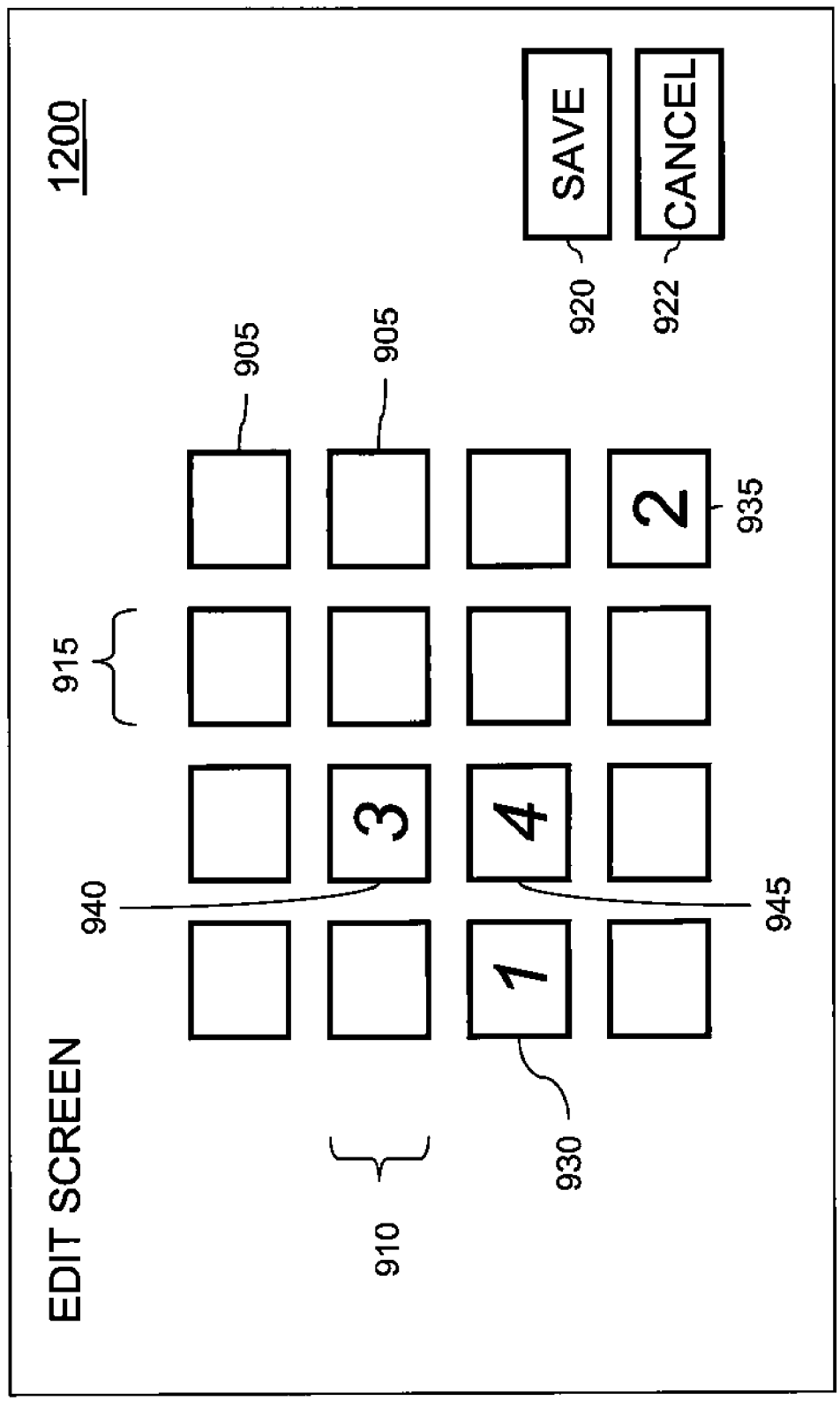
FIG. 12 illustrated an updated EDIT screen according to another example embodiment.

FIG. 12 illustrated an updated EDIT screen 1200 according to another example embodiment. FIG. 12 illustrates an EDIT screen 1200 after several iterations, or user video scene selections have occurred in during the process of FIG. 10. As shown in FIG. 12, elements 930, 935, 940 and 945 among the plurality of selectable elements 905 are selected. The sequential order of the selected elements is also shown, such that a first sequential video scene in the digital scene selection file corresponds to selected element 930, followed by selected element 935, followed by selected element 940, followed by selected element 945 (e.g., "1", "2", "3" and "4", respectively).

FIG. 13 illustrates an updated EDIT screen 1300 according to another example embodiment. FIG. 13 illustrates an EDIT screen 1300 after a single iteration, or user video scene selection, during the process of FIG. 10, subsequent to the EDIT screen 1200 of FIG. 12. However, in FIG. 13, it is assumed that the user 135 selects a previously selected element in the most recent selection step S1010, namely, the previously selected element 935. Accordingly, at S1015, the previously selected element 935 is de-selected, and the EDIT screen 1300 of FIG. 13 is updated accordingly. As shown in FIG. 13, the sequential order or sequence of the video scenes corresponding to the selected elements 940 and 945, which previously followed that of the video scene corresponding to the element 935, have been reduced or "bumped up" to account for the removal or de-selection of the selected element 935 from the display order or sequence.

While not explicitly illustrated in FIG. 10, it is understood that at any time after at least one video scene selection has been made and at least one video scene selection is included in the digital scene selection file, the user 135 may, at his or her discretion, click on either the SAVE button 920 or the CANCEL button 922 to either save or cancel, respectively, the current digital scene selection file.

In an alternative example embodiment, referring to FIGS. 9 through 13, the displayed sequential order need not be based on the chronological entry of the user's 135 video scene selections. For example, certain ones of the selectable elements 905 within certain columns 915 or rows 910 may be prioritized or hierarchical, such that selections within a given row may have sequential precedence within the digital scene selection file over other columns and/or rows. For example, if selectable elements 905 of a first column 915 correspond to alternative video introductions, and selectable elements 905 of a second column 915 correspond to alternative video conclusions (e.g., movie credits, etc.), it will be appreciated that a selected "introduction" will be played prior to a selected "conclusion", unless the user 135 dynamically overrides this default sequential ordering rule.

Example Applications

Example applications of the example embodiments of the present invention will now be described with respect to the system 100 of FIG. 1. While the example applications given below are described with respect to particular media platforms and electronic devices, or particular types of content, it is understood that other example embodiments of the present invention may be directed for use with any media format with any electronic device suitable for the selective delivery of any type of media content to the user 135.

Scenes Based on Movie Ratings

In an example, each of the plurality of next scene selections 710/715/720/725 provided in the PROGRAM PROMPT screen 700 during the user prompt function S615 of the process of FIG. 6 are associated with a rating of the Motion Picture Association of America (MPAA). The MPAA ratings designate content which is suitable for General Audiences ("G"), Parental Guidance suggested ("PG"), Parents Strongly cautioned ("PG-13"), Restricted ("R"), and NC-17 (i.e., no one under 17 is admitted). Accordingly, assume that a given movie is edited four different ways so as to provide four versions of the same movie which are rated G, PG, PG-13 and R, respectively. The next scene selections 710/715/720/725 are associated with the G, PG, PG-13 and R rated versions, respectively. Thus, if the user 135 selects the G rated version for a next scene by clicking on the next scene selection 710 during the user prompt at S615, the G rated version of the next scene is played, and so on.

In another example, the pre-selected digital scene selection files accessed via the PRE-SELECTION button 315 at S230 (FIG. 2) include digital scene selection files associated with a series of selections (e.g., spanning the full duration of a movie) in accordance with one or more of the MPAA ratings. For example, a pre-selected G rated version including all of the G rated scenes is available, a pre-selected PG rated version including all of the PG rated scenes is available, and so on. It will be understood that any scene associated with a "lower" rating, where G is lower than PG, PG is lower than PG-13, and so on, functions as a "higher" rating scene if no other higher rating scene is available.

For example, if a dialogue scene in the movie "The Terminator" includes no swears/curses or other adult content and is rated "G" and no alternative versions of this G rated scene exist, the G rated scene will be used for all "higher" rating versions of the scene. It will be appreciated that the reverse is not true, and that scenes specifically rated R are not available in lower rated versions, such as the G rated version (e.g., at least in the R rated form without censorship).

Alternative Versions of the Same Scene

As discussed in the Background of the Invention, a director typically shoots/films a scene more than once. After the film is shot, the director reviews all of the filmed scenes and selects one version of each scene to potentially make the "final cut" for the film. The director makes these determinations based on personal preference (i.e., whichever scene is his or her favorite scene), commercial factors (e.g., a scene predicted to be the most successful commercially, such as a "Hollywood" ending) or other decision making criteria. However, it is unlikely that any given selected scene would be the favorite version for all potential audience members; at least a few audience members would leave unsatisfied.

Accordingly, in an example each of the plurality of next scene selections 710/715/720/725 provided in the PROGRAM PROMPT screen 700 during the user prompt function S615 of the process of FIG. 6 are associated with different versions of the same scene. In an example, the next scene selection 710 is always associated with the scene selected by the director, and the next scene selections 715/720/725 are associated with alternative (i.e., cut or deleted) content. Thus, it will be appreciated that each user 135 may in a sense become the director of his/her own movie by selecting scenes not included in the official "final cut", thereby enhancing his or her viewing experience.

In a further example, one or more of the next scene selections 710/715/720/725 may be associated with one or more remakes of an original movie. For example, if the viewed movie is King Kong, the next scene selection 710 provides scene selections from the 1933 movie version, the next scene selection 715 provides scene selections from the 1966 TV Series, the next scene selection 720 provides scene selections from the 1976 movie version, and the next scene selection 725 provides scene selections from the 2005 movie version. The scene selections are "pre-aligned" such that, from a narrative stand point, the movie tells a cohesive story irrespective of the particular scene selections made by the user 135.

In another example, one or more of the next scene selections 710/715/720/725 may be associated with "alternate endings" of an original movie. In this example, it will be appreciated the scene selections for the alternate endings will typically become available at later scenes (i.e., towards the end of the movie).

Educational Content Level

In another example, each of the plurality of next scene selections 710/715/720/725 provided in the PROGRAM PROMPT screen 700 during the user prompt S615 of the process of FIG. 6 are each associated with different educational content levels. In an example, if the video program is associated with an educational video, the next scene selections 710/715/720/725 correspond to grade levels. In a more detailed example, assume that the educational video is a math lesson and that the next scene selections 710/715/720/725 correspond to elementary grade levels of 1, 2, 3 and 4, respectively. Generally, the next scene selection 710 may be more simplistic and general as compared to the "higher" elementary grade level scene selections 715/720/725. For example, an example grade 1 scene relates to addition, an example grade 2 scene relates to subtraction, an example grade 3 scene relates to multiplication and an example grade 4 scene relates to division, which may be expressed as set forth below in Table 1:

TABLE 1

| Grade Level | Expression |
| --- | --- |
| Grade 1 | 1 + 1 = 2 |
| Grade 2 | 1 − 1 = 0 |
| Grade 3 | 1 * 1 = 1 |
| Grade 4 | 1/1 = 1 |

Thus, a teacher may adjust the educational content level of educational videos dynamically in the interactive play-mode, for example, based on a student response to the content such that the educational scene selection level is increased if the students are bored and decreased if the students are confused. Alternatively, the teacher may load pre-selected scenes associated with a given grade level via the PRE-SELECTION button 315 and function S230. In yet another alternative example, the teacher may launch a saved version of scene selections from a prior year's class via the LOAD button 310 and function S215.

Educational Programming

In another example, each of the plurality of next scene selections 710/715/720/725 provided in the PROGRAM PROMPT screen 700 during the user prompt S615 of the process of FIG. 6 are each associated with different educational lessons. In an example, if the video program is associated is associated with a medical text book, the next scene selections 710/715/720/725 correspond to different medical lessons, such as kidney disorder treatments, causes of mucus membrane infections, and so on.

Here, the next scene selections 710/715/720/725 correspond to Chapters and Sub-Chapters. Thus, a plurality of "Chapters" are first displayed to the user 135. In this example, the Chapters are Mouth, Heart, Lungs and Stomach. Once the user 135 selects one of the prompted selections, Sub-Chapters are prompted to the user.

In this example, the Sub-Chapters include Description, Symptoms, Causes and Graphic. When the user 135 selects one of the Sub-Chapters, the Sub-Chapter video lesson is displayed to the display 125. Thus, it will be appreciated that the user 135 may determine his or her own lesson plan for a medical course by navigating through the Chapter/Sub-Chapter interface. It will be readily appreciated that the above-described example embodiment may be directed to other types of lesson planning, such as for law school courses, engineering courses, etc.

Price Differentiation

In another example, each of the plurality of next scene selections 710/715/720/725 provided in the PROGRAM PROMPT screen 700 during the user prompt 6 S615 of the process of FIG. 6 are each associated with different prices. In an example, the next scene selection 710 is free, the next scene selection 715 costs a first amount of money, the next scene selection 720 costs a second amount of money higher than the first amount, and so on, with the next scene selection 725 costing the most money but also offering the most desirable content.

Video Type and Format

In another example, each of the plurality of next scene selections 710/715/720/725 provided in the PROGRAM PROMPT screen 700 during the user prompt at S615 of the process of FIG. 6 are each associated with different video types or formats. In an example, the next scene selection 710 is cartoon animated, the next scene selection 715 is a "live-action" version, and the next scene selection 720 is generated via computer generated imagery (CGI), and so on.

Demographics

In another example, the MAIN MENU 300 of FIG. 3 may further include a user demographic toggling feature. The user demographics may be provided to the user 135 as a selection list. Below, Table 2 lists an example set of user demographics which may be employed by the

TABLE 2

| Gender | Age Range |
|---|---|
| Male | Child |
| Female | Child |
| Male | Young Adult |
| Female | Young Adult |
| Male | 18-35 |
| Female | 18-35 |
| Male | 36-55 |
| Female | 36-55 |

Advertisements displayed to the user 135 during a played video program may be determined based at least in part on the selected user demographic. For example, cosmetics and clothing advertisements may be more prevalent for the female/young adult user demographic as compared to the male/36-55 demographic. Likewise, NASCAR merchandise may be more prevalent for the male/young adult demographic as compared to the female/36-55 demographic.

It will also be appreciated that the male/child and female/child demographics may be employed in conjunction with the MPAA rating restrictions, such that scenes which are rated R or NC-17 are not provided as selectable options to the user 135 if a child demographic is selected.

Video Resolution

In another example, each of the plurality of next scene selections 710/715/720/725 provided in the PROGRAM PROMPT screen 700 during the user prompt at S615 of the process of FIG. 6 are each associated with different video resolutions. Example of common video resolutions include 700×600, 1024×767, 1152×764 and 1600×1200. Thus, in an example, the next scene selection 710 is associated with a first video resolution of 700×600, the next scene selection 715 is associated with a second video resolution of 1024×767, the next scene selection 720 is associated with a third video resolution of 1152×764 and the next scene selection 725 is associated with a fourth video resolution 1600×1200.

Combinations of Scene Characteristics

It will be readily apparent that the above-described examples of scene characteristics accessible via the next scene selections 710/715/720/725 may be employed either alone or in combination with any other scene characteristics.

In an example, the next scene selection 710 is an animated version of a first scene associated with a first educational level at a video resolution of 700×600 and is distributed freely; the next scene selection 715 is a "live-action" version of the first scene associated with a second educational level, the second educational level higher than the first educational level, at a resolution of 1024×767 and is available on a pay-per-view basis (e.g., $1.50 per view) and/or on a subscription basis (e.g., $20 per month for unlimited views); the next scene selection 720 is a "live-action" version of a second scene, the second scene being an alternative scene to the first scene, associated with the second educational level at a resolution of 1152×764 and is available on a pay-per-view basis only (e.g., $3.00 per view) which is higher than the pay-per-view option of the next scene selection 715; and the next scene selection 725 is identical to the next scene selection 720 except that the next scene selection 725 is distributed at a resolution of 1600× 1200 and costs slightly more on a pay-per-view basis. It is readily apparent that the example configuration above can be modified in any number of ways.

Scene Sharing

In another example embodiment, the multimedia dynamic viewing process of FIG. 2 is viewed as part of a social community network which encourages the sharing of the user's 135 digital scene selection files so as to increase consumer interest and enjoyment of multimedia content.

While not shown in the Figures, the user 135 has the option via the MAIN MENU 300 to send stored digital scene selection files to other users. In an example, the digital scene selection files are sent over the data connection 110 to other users. In an example, the user 135 uses a first Play station Portable (PSP), which collapses the media reading device 115, the display 125 and the user input device 130 into a single electronic hand-held device, to send the digital scene selection file to another PSP in proximity to the first PSP over an ad-hoc network. For example, a direct wired or wireless connection is established between the first and second PSPs and the digital scene selection file is transferred using well-known digital file transfer methods.

Alternatively, the user 135 may upload the digital scene selection file to a server, such as the information gathering system 105, which offers the uploaded digital scene selection file for downloading to internet users via an internet website. Alternatively, the user 135 may send the digital scene selection file to other users via one or more of a wireless communications channel, a wired communications channel, an email, a text message, and a physical storage device (e.g., the content media 120).

The digital scene selection file is not necessarily envisioned as including the actual stored video programming, although, at least in theory, digital scene selection file could be configured to include video programming stored therein. Rather, the digital scene selection file is embodied as a digital file, such as a text file, which includes digital representations of scene selections. The actual multimedia video content is retrieved separately and in accordance with the instructions stored in the digital scene selection file, such as through a DVD. The digital scene selection files may thus be distributed without the possibility of copyright infringement (i.e., piracy), which has become prevalent on the internet and is a large source of a concern for those in the intellectual property community, such as movie studios.

Scene Reporting

The digital scene selection files generated by the user 135 may periodically be uploaded or "reported" to a media server (e.g., information gathering system 105) for tracking user activity. For example, if the digital scene selection file corresponds to video scene selections from a television show (e.g., Lost, "24", etc.), the media server may be configured to track television show ratings. In a further example, the media server is a Nielson server which generates Nielson ratings, which are commonly used to rank television shows. In this example, the media server ranks different versions of a related television show, such that a most popular version can be determined.

Example embodiments of the present invention being thus described, it will be obvious that the same may be varied in many ways. For example, while some of the above-described example embodiments of the present invention are described with respect to PSPs, it is understood that other example embodiments may embody the media reading device 115, the display 125 and the user input device 130 as other types of electronic devices, such as computers, Nintendo Gameboys, and/or any other type of media delivery system. Such variations are not to be regarded as a departure from the example embodiments herein, and all such modifications are intended to be included within the scope of the invention as recited in the following claims.

We claim:

1. A method of enhancing a viewer's experience of a video program, comprising:
    providing a plurality of selectable alternative video program scenes for a video program being viewed on a display, the selectable alternative video program scenes being pre-rendered video scenes that are displayed on a portion of the display as a plurality of selectable elements in a multiple column by multiple row navigation grid, the navigation grid formatted so that each row represents a sub-chapter of the plurality of selectable elements that are common to all columns and each column represents a chapter having designated sub-chapters therein that are tied to the respective chapter;
    prompting a user to select one or more of the plurality of selectable elements in the navigation grid;
    storing the user selections from the navigation grid as a digital scene selection file; and
    loading the digital scene selection file to replay the video program as modified with the one or more video program scenes corresponding to the one or more selectable elements selected from the navigation grid on the display.

2. The method of claim 1, wherein the selectable alternative video program scenes are different editing cuts of the same video program scene.

3. The method of claim 1, wherein the selectable alternative video program scenes include video scenes associated with one or more remakes of an original video program.

4. The method of claim 1, wherein the selectable alternative video program scenes are associated with different educational levels.

5. The method of claim 1, wherein one or more of the selectable alternative video program scenes are associated with different prices.

6. The method of claim 1, wherein the selectable alternative video program scenes include at least one of an animated option and a live-action option.

7. The method of claim 1, wherein the selectable alternative video program scenes are associated with different demographics.

8. The method of claim 1, wherein the selectable alternative video program scenes are associated with different movie ratings based on content provided within the selectable alternative video program scenes.

9. The method of claim 1, wherein prompting includes displaying an advertisement.

10. The method of claim 9, wherein the advertisement is displayed during the prompting step in proximity to the navigation grid of selectable alternative video program scenes.

11. The method of claim 1, further comprising:
    receiving a user scene selection in response to the prompting; and
    tuning to one of a plurality of broadcasted digital signals based on the user scene selection, the plurality of broadcasted digital signals corresponding to the plurality of selectable alternative video program scenes.

12. The method of claim 11, wherein the broadcasted digital signals are broadcasted over one or more of a cable channel, an internet channel, a wireless channel and a satellite channel.

13. The method of claim 1, further comprising:
    sending the digital scene selection file to at least one other user.

14. The method of claim 1, wherein each of the selected program scenes is displayed to the user in a given sequence.

15. The method of claim 14, wherein the given sequence is user designated.

16. The method of claim 15, wherein the given sequence corresponds chronologically to the sequence in which the user selected the selected program scenes.

17. The method of claim 14, wherein the given sequence corresponds to a default sequence of selectable elements within the navigation grid.

* * * * *

UNITED STATES PATENT AND TRADEMARK OFFICE
CERTIFICATE OF CORRECTION

| | | |
|---|---|---|
| PATENT NO. | : 7,669,128 B2 | |
| APPLICATION NO. | : 11/687721 | |
| DATED | : February 23, 2010 | |
| INVENTOR(S) | : Bailey et al. | |

It is certified that error appears in the above-identified patent and that said Letters Patent is hereby corrected as shown below:

Column 1, line 28, "e.g., a movie studio, a director, etc." should read --e.g. a movie studio or a director--; line 29, "which" should read --that--; line 60, "The plurality of video scene selections are associated" should read --The plurality of alternative scene selections is associated--

Column 2, line 9, "which" should read --that--; line 34, "illustrated" should read --illustrates--; lines 42, 45, the single quotation marks should be changed to double quotation marks; line 60, "brail" should read --Braille--; line 61, "pre-existing" should read --preexisting--

Column 3, line 2, "non-linear" should read --nonlinear--; line 5, "example methods, or which" should read --example methods or that--; line 13, "for example" is redundant and should be deleted; line 14, "password locked" should read --password-locked--; line 33, the "," should be moved inside the quotation marks; line 41, "e.g. an on-site or accessible server, an off-site or not directly accessible server, etc." should read --e.g. an on-site or accessible server, or an off-site or not directly accessible server--; line 45, "to physically store" should read --to store physically--; lines 47, 59, "etc." is redundant and should be removed Column 4, lines 6, 8, 20, 47, 51, "etc." is redundant and should be removed; line 9, "which" should read --that--; line 18, "In alternative examples, the media reading device 115 may be a cable modem, a DSL modem, a wireless Ethernet card, etc." should read --In alternative examples, the media reading device 115 may be a cable modem, a DSL modern, or a wireless Ethernet card.--; lines 43, 47, "game boy" should read --Game Boy--; line 46, "such as a video IPOD, a cell phone, a Nintendo game boy, a PSP, etc." should read --such as a video iPod, a cell phone, a Nintendo Game Boy, or a PSP--; line 61, "which" should read --that--

Column 5, line 2, "by loading, from the content media device 120, a video scene" should read --by loading a video scene from the content media device 120--; line 8, the "," should go within the quotation marks; lines 20, 25, "sub-menu" should read --submenu--; lines 29, 35, 40, "etc." is redundant and should be removed; line 47, "which" should read --that--; line 48, "sub-menus" should read --submenus--; line 60, "PRE-SELECTION" should read --PRESELECTION--

Signed and Sealed this
Eighth Day of February, 2011

David J. Kappos
*Director of the United States Patent and Trademark Office*

CERTIFICATE OF CORRECTION (continued)

Column 6, lines 30, 36, "play-mode" should read --play mode--; line 31, "pre-selected" should read --preselected--; line 66, "although" should be removed Column 7, lines 1, 60, "etc." is redundant and should be removed; line 11, the "," should be moved within the quotation marks; line 46, "which" should read --that--; line 51, "include" should read --includes--; line 58, "for example, the "inactive" scenes may be faded, displayed in grayscale instead of color, etc." should read --for example, the "inactive" scenes may be faded or displayed in grayscale instead of color--; line 60, "Each of the plurality of SCENE VIEW buttons are responsive buttons which allow the user to toggle" should read --Each of the plurality of SCENE VIEW buttons is a responsive button that allows the user to toggle--

Column 8, line 5, "which" should read --that--; line 9, "although" should be deleted; line 11, "etc" is redundant and should be deleted; lines 20, 33, "e.g." should read --i.e.--; line 37, "PRE-SELECTION button 310" should read --PRESELECTION button 315--; line 40 (2X), 42, 44, 48, "pre-selected" should read --preselected--; line 45, the "," should be moved within the quotation marks; lines 55, 57, 60, 62, 64, "play-mode" should read --play mode--, line 55, "e.g." should read --i.e.--; line 56, "pre-set" should read --present--; line 58, "PRE-SELECTION" should read --PRESELECTION--

Column 9, line 1, "a" should read --the--; line 17, "PROGRAM PROMPT scene 700 which" should read --PROGRAM PROMPT scene 700, which--; line 35, "although" should be removed; line 63, "e.g. G, PG, PG-13, R, NC-17, etc." should read --i.e. G, PG, PG-13, R, or NC-17--; line 64, "or alternatively the highest movie content rating" should read --or, alternatively, the highest movie content rating--; line 67, "adult oriented" should read --adult-oriented--

Column 10, line 11, "play-mode" should read --play mode--; line 16, "to the S200" should read --to S200--; line 29, "user-selections" should read --user selections--; line 44, "e.g." is not necessary and should be deleted, line 53, "e.g." should read --i.e.--; lines 57, 59, 62, "play-mode" should read --play mode--; line 59, "pre-set" should read --preset--; line 60, "PRE-SELECTION" should read --PRESELECTION--; line 64, "which" should read --that--

Column 11, line 1, "pre-selected" should read --preselected-- and "pre-defined" should read --predefined--; line 5, "play-mode" should read --play mode--; line 11, "e.g." should read --i.e.--; line 19, "e.g." is not necessary and should be deleted; line 37, "etc." is redundant and should be removed; line 38, "e.g." should read --i.e.--; line 43, "selectable element 930" should read --selectable element 905--

Column 12, line 3, a --,-- should be inserted after "selections"; line 7, the "," after "shown" should be removed; line 11, "e.g." should read --i.e.--; lines 21, 27, "de-selected" should read --deselected--; line 41, "prioritized or hierarchical, such that" should read --prioritized or hierarchical such that--; line 47, "etc." is redundant and should be removed; line 48, "prior to a selected "conclusion", so that" should read --prior to a selected "conclusion" so that--

CERTIFICATE OF CORRECTION (continued)
U.S. Pat. No. 7,669,128 B2

Column 13, line 4, "suitable" should read --Suitable--; line 5, "cautioned" should read --Cautioned--; line 6, "no one under 17 is admitted" should read --no one 17 and under is admitted--; line 9, there should be a "," after "movie"; lines 11, 34, "R rated" should read --R-rated--; lines 12, 14, 21, 30, 31, 34, "G rated" should read --G-rated--; line 17, "PRE-SELECTION" should read --PRESELECTION--; line 22, "PG rated" should read --PG-rated--; line 29, "swears/curses" should read --swear words/curse words--; line 30, there should be a "," within the quotation marks after the first G; line 34, "lower rated" should read --lower-rated--; line 47, "decision making" should read --decision-making--; line 51, "in an example" should read --in an example,--; line 54, "are" should read --is--; line 61, the "," should be moved within the quotation marks; line 66, "King Kong" should be put in double quotation marks or italicized Column 14, line 2, "Series" should read --series--; line 11, "it will be appreciated the scene selections" should read --it will be appreciated that the scene selections--; line 45, "play-mode" should read --play mode--; line 49, "pre-selected" should read --preselected--; line 62, "are" should read --is--; line 63, "is associated is associated" should read --is associated--; line 64, "text book" should read --textbook--; line 66, "mucus membrane" should read --mucous membrane--; line 67, "and so on" is redundant and can be deleted Column 15, line 16, "etc." is redundant and should be removed; line 20, "next scene" should read --next-scene--; lines 23, 36, "are" should read --is--; line 38, "cartoon animated" should read --cartoon-animated--; line 48, the sentence ends abruptly Column 16, line 14, "are" should read --is--; line 55,"which" should read --that--; line 62," Play station  Portable" should read --Play Station Portable--; line 65, "hand-held" should read --handheld--

Column 17, line 7, "internet" should read --Internet-- (2 occurrences); line 15, "digital scene selection file" should read --the digital scene selection file--; line 24, "internet" should read --Internet--; line 35, "Lost" should be put in quotation marks, and the "," after "24" should be moved within the quotation marks; line 37, "which generates Nielsen ratings" should read --that generates Nielsen ratings--; line 40, the "," before "such that" should be removed; line 48, "Gameboys" should read --Game Boys--

Column 18, line 49, "internet" should read --Internet--; line 57, "user designated" should read --user-designated--